United States Patent
Kuhn et al.

(10) Patent No.: US 9,926,147 B2
(45) Date of Patent: Mar. 27, 2018

(54) STACKING DEVICE AND STACKING METHOD

(71) Applicant: AUTEFA SOLUTIONS GERMANY GMBH, Friedberg (DE)

(72) Inventors: Rudolf Kuhn, Neusäβ (DE); Peter Knobloch, Gersthofen (DE)

(73) Assignee: AUTEFA SOLUTIONS GERMANY GMBH, Friedberg (DE)

( * ) Notice: Subject to any disclaimer, the term of this patent is extended or adjusted under 35 U.S.C. 154(b) by 0 days.

(21) Appl. No.: 15/121,941

(22) PCT Filed: Feb. 27, 2015

(86) PCT No.: PCT/EP2015/054111
§ 371 (c)(1),
(2) Date: Aug. 26, 2016

(87) PCT Pub. No.: WO2015/128452
PCT Pub. Date: Sep. 3, 2015

(65) Prior Publication Data
US 2017/0073173 A1    Mar. 16, 2017

(30) Foreign Application Priority Data
Feb. 27, 2014    (DE) .................... 20 2014 100 905 U

(51) Int. Cl.
*B65G 57/00*     (2006.01)
*B65G 61/00*     (2006.01)
(Continued)

(52) U.S. Cl.
CPC ............ *B65G 61/00* (2013.01); *B65B 17/025* (2013.01); *B65G 57/005* (2013.01); *B65G 57/035* (2013.01); *B65G 59/067* (2013.01)

(58) Field of Classification Search
CPC .................. B65G 57/03; B65G 65/02; B65G 2201/0267; B65G 2207/14; B65G 2814/0305; B65G 2814/0313
USPC ..... 209/499; 414/788.7, 788.8, 791.6, 792.8, 414/795.4, 795.6, 796.1, 796.6, 796.7, 414/796.8, 796.9, 797.4, 797.5, 797.8,
(Continued)

(56) References Cited

U.S. PATENT DOCUMENTS 2,768,756 A    10/1956   Horman
3,428,192 A *   2/1969   Witmer ................ B65G 59/063
                                                 414/796.2
(Continued)

FOREIGN PATENT DOCUMENTS

DE    20 63 677 A1    7/1972
DE    296 03 566 U1   4/1996
(Continued)

*Primary Examiner* — Gregory W Adams
(74) *Attorney, Agent, or Firm* — McGlew and Tuttle, P.C.

(57) ABSTRACT

A method and device for stacking layers of goods (2) is based on a stacking device (1) that includes a handling mechanism (15) which handles, laterally moves, and stacks loose slip-on receptacles (3). The loose slip-on receptacles (3) are open on the bottom, accommodate a layer of goods (2) in the interior (11) thereof, and carry the layer of goods (2) along as the receptacles (3) are slidingly conveyed. An upward-facing bottom (7) of the slip-on receptacles (3) forms the supporting surface (8) for the subsequent layer of goods (2).

21 Claims, 7 Drawing Sheets

(51) Int. Cl.
*B65B 17/02* (2006.01)
*B65G 57/03* (2006.01)
*B65G 59/06* (2006.01)

(58) Field of Classification Search
USPC .... 414/797.9, 798.1, 799; 53/249, 250, 251, 53/252, 544
See application file for complete search history.

(56) References Cited

U.S. PATENT DOCUMENTS

| | | | |
|---|---|---|---|
| 3,648,857 A | | 3/1972 | Grasvoll |
| 3,895,477 A | * | 7/1975 | Yamashita ............... B30B 15/32 254/122 |
| 3,935,967 A | * | 2/1976 | Doucette ............... B65B 17/025 221/222 |
| 4,032,021 A | * | 6/1977 | Mabey ................ B65G 59/005 414/564 |
| 5,083,411 A | * | 1/1992 | Axmann ................ B65G 60/00 414/788.7 |
| 5,230,601 A | * | 7/1993 | Apps .................. B65D 21/0212 414/788.2 |
| 5,282,348 A | * | 2/1994 | Dampier ............... B65B 17/025 53/398 |
| 5,469,687 A | * | 11/1995 | Olson .................. B65B 17/025 53/134.1 |
| 2005/0265817 A1 * | | 12/2005 | Blanc ..................... B65G 57/24 414/799 |
| 2005/0269229 A1 * | | 12/2005 | Lowry ................. B65D 19/385 206/386 |
| 2014/0010629 A1 * | | 1/2014 | Abraham ............. A47L 15/501 414/802 |

FOREIGN PATENT DOCUMENTS

| | | |
|---|---|---|
| JP | 2000 204900 A | 7/2000 |
| WO | 2008/138556 A2 | 11/2008 |
| WO | 2008/138556 A3 | 11/2008 |
| WO | WO 2013038102 A1 * 3/2013 | ............... B65G 7/24 |

* cited by examiner

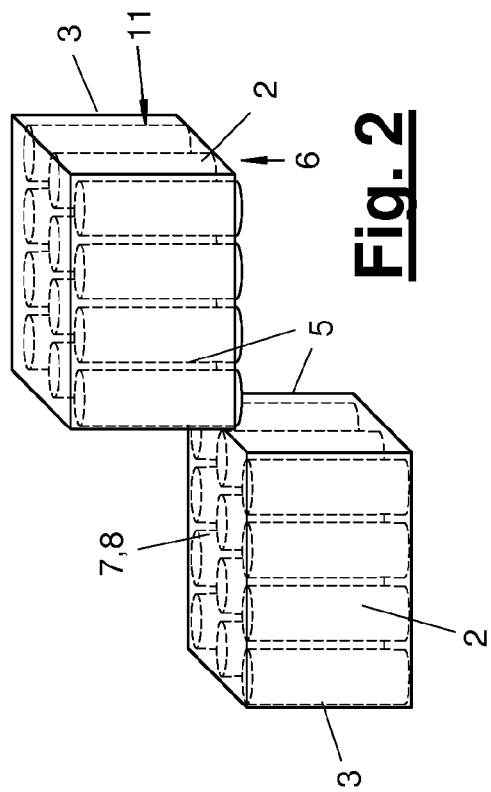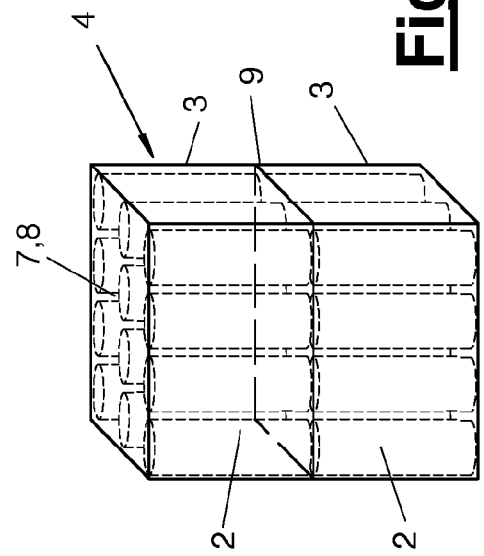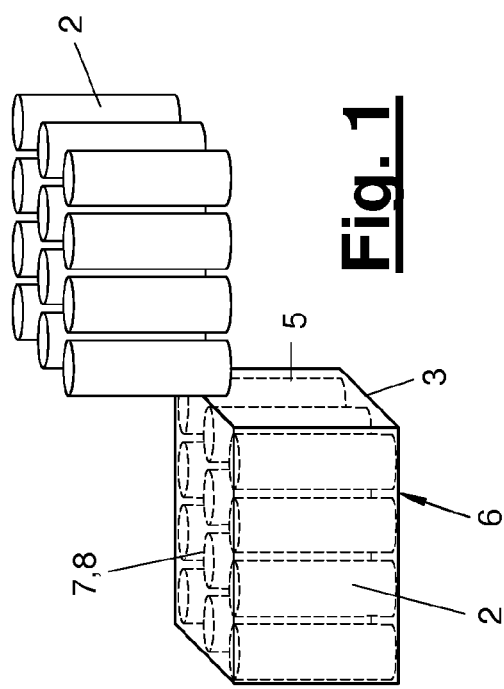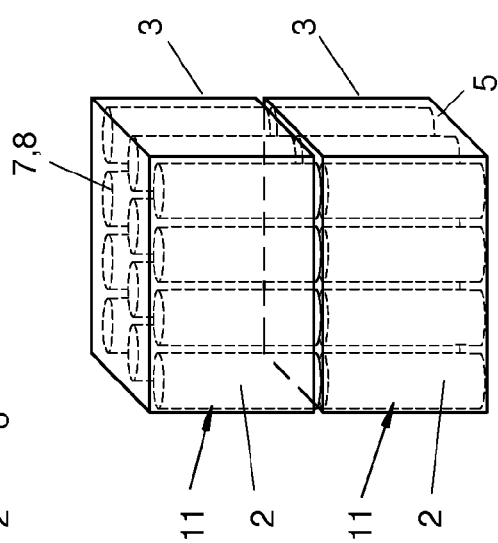

STACKING DEVICE AND STACKING METHOD

CROSS REFERENCE TO RELATED APPLICATIONS

This application is a United States National Phase Application of International Application PCT/EP2015/054111 filed Feb. 27, 2015 and claims the benefit of priority under 35 U.S.C. § 119 of German Application 20 2014 100 905.1 filed Feb. 27, 2014, the entire contents of which are incorporated herein by reference.

FIELD OF THE INVENTION

The present invention pertains to a stacking device and to a stacking method having the features described in the preamble of the principal method claim and in the principal device claim.

BACKGROUND OF THE INVENTION

Stacking devices that are configured as palletizing devices and stack and unstack layers of goods in a stack of pallets, wherein the layers of goods are in disk-like intermediate layers made of cardboards and are separated hereby from one another are known from practice. The palletizing device grips the layers of goods formed, e.g., by bottles with a bottle gripper and transfers them onto the pallet and the intermediate layers.

SUMMARY OF THE INVENTION

An object of the present invention is to provide an improved stacking technique.

This object is accomplished by the present invention with a stacking device and the stacking method that have the advantage of high technical and economic efficiency. In addition, only little effort is needed for construction. In addition, advantages arise concerning the reliability of operation in the guiding and stacking of layers of goods. In addition, the layers of goods can be accommodated in inverted containers placed one on top of another in a storage space that is closed all around such that they are protected against environmental effects. This is favorable especially from a hygienic point of view.

The stacking technique according to the invention has the additional advantage that the loose inverted containers can be used for the protective accommodation of a layer of goods, on the one hand, and, on the other hand, for slidingly conveying them. The layer of goods is held securely and laterally guided during the conveying motion. In addition, the layer of goods can be gripped and guided completely with the inverted container. Complex individual grippers, such as those commonly used hitherto for palletizing, can be eliminated.

The inverted containers may have a simple and cost-effective type of construction. They may also consist of a lightweight material, especially plastic. In addition, the requirements imposed on the stability of the inverted containers are comparatively low, which is likewise reflected by saving materials and costs.

The stacking technique according to the invention makes it possible to stack and unstack inverted containers and layers of goods. Circulation of containers within a stack of containers and the stacking device is also possible now. Interior and storage spaces can be filled with layers of goods and emptied.

The stacking technique may especially advantageously be a part of a storage device, which may offer, for example, a buffer storage device in production and treatment plants for bottles or other goods. There are special advantages for bottles, especially lightweight plastic bottles, because of their sensitivity to shocks and damage that may occur during conveying and because of their limited stability.

The gripping of layers of goods, especially layers of goods comprising bottles, layer by layer offers, in addition, advantages for the effort needed for handling and orientation. Such bottles or other containers sometimes have a special and non-symmetrical shape and are fed, e.g., from a blowing machine or another production or unpacking device with a special orientation in individual rows in one layer. This orientation can be maintained with certainty thanks to the stacking technique according to the invention. In particular, the goods can be picked up layer by layer for stacking and released again in the same position orientation for unstacking. The efforts needed for safety and control for maintaining the orientation of the goods during stacking are minimal as a result.

The present invention pertains, in addition, to a stackable container for a layer of goods, which is configured as an inverted container and has side walls as well as a container opening on one front side and a container bottom on the opposite front side, wherein the container bottom has on the outer side an essentially flat wall, which is configured as a supporting surface favorable for sliding for pushing up and supporting a layer of goods. The inverted container may have a guiding device for laterally guiding a picked-up layer of goods.

The present invention pertains, furthermore, to a stack of containers, which has a plurality of box-shaped inverted containers stacked one upon another in a respective turned-over stacking position with downwardly directed container opening and with upwardly directed container bottom.

The inverted containers are supported on one another in the stack of containers and are preferably guided at one another in a positive-locking manner. Adjacent inverted containers form a closed storage space each for a layer of goods in the stack of containers.

The present invention is schematically shown in the drawings as an example. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1 is a schematic perspective view showing a part of a procedure of gripping and stacking a layer of goods with inverted containers;

FIG. 2 is a schematic perspective view showing another part of a procedure of gripping and stacking a layer of goods with inverted containers;

FIG. 3 is a schematic perspective view showing another part of a procedure of gripping and stacking a layer of goods with inverted containers;

FIG. 4 is a schematic perspective view showing another part of a procedure of gripping and stacking a layer of goods with inverted containers;

DESCRIPTION OF THE PREFERRED EMBODIMENTS

Figure 5:
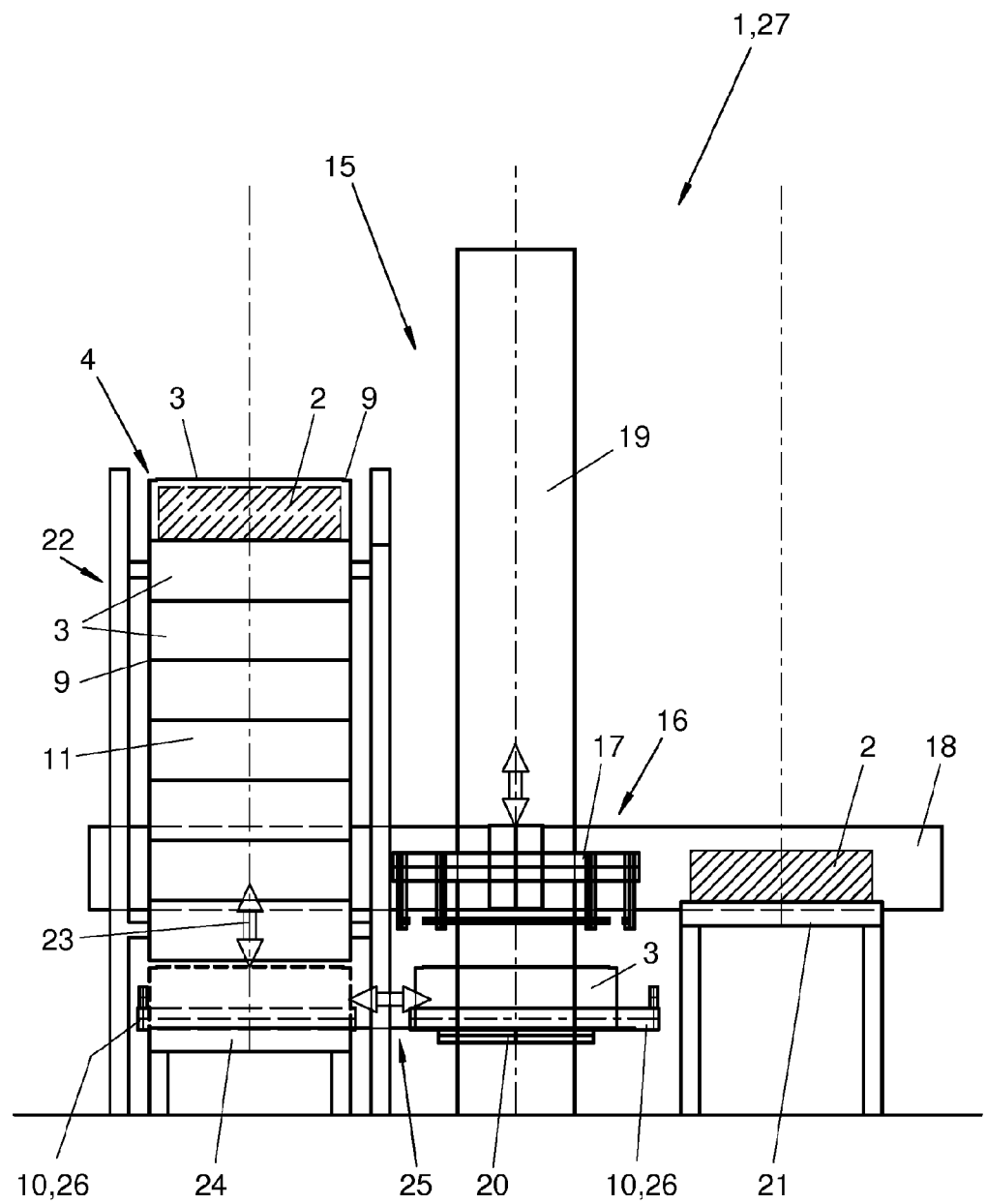
FIG. 5 is a schematic view showing a stacking device in one of different operating positions.

Referring to the drawings, the present invention pertains to a stacking device (1) and to a stacking method for layers of goods (2). It pertains, further, to a storage device (27) and to a storage method with such a stacking technique and to an inverted container (3) as well as to a stack of containers (4).

The layer of goods (2) may be formed by one or more goods. The goods may be arranged next to one another and optionally also one on top of another. The goods consist of empty or filled bottles or other containers in the preferred exemplary embodiments shown. Other forms of goods may be packets, bags or the like.

The goods stand next to each other within the layer of goods (2) in the exemplary embodiments shown. They may stand in a regular matrix, which is formed by a plurality of rows of goods arranged next to one another and oriented in the same way. An offset of rows and nesting of the individual goods in adjacent rows is also possible in another embodiment.

FIGS. 1 through 4 show a stacking operation in a plurality of steps. The stacking is carried out by means of inverted containers (3), which have side walls (5), a downwardly directed front-side container opening (6) and an upwardly directed front side. The inverted containers (3) may have the shape of turned-over boxes or trays. They may be turned over a layer of goods (2) with their lower container opening (6). As a result, they pick up the layer of goods (2) in their interior (11), and the layer of goods (2) is supported in another way from the bottom.

The inverted container (3) may have, e.g., a cubic shape and any desired format, e.g., corresponding to a Euro pallet. It may consist of any desired material, especially plastic, metal or wood or even composites. The format of the interior (11) is preferably adapted to the format of the layers of goods in size and shape and is slightly larger.

The side walls (5) laterally enclose the layer of goods (2) in the inverted position. They enclose them preferably on all sides and offer a lateral guidance for the layer of goods (2) as a result. The four side walls are connected rigidly to one another and preferably also to the container bottom (7) in the exemplary embodiments shown, and they form a type of frame for the layer of goods (2).

In another embodiment, at least one side wall (5) may be configured as a movable side wall. This may a pivoting mobility in the manner of a door. In another variant, one side wall (5) may also be eliminated, so that the other side walls form a fork for laterally encompassing a layer of goods (2). Any desired other shape of outline is possible instead of the rectangular outline in another variant.

The side walls (5) have a flat shape and have a massive configuration in the exemplary embodiments shown. In another variant, they may have interruptions, e.g., perforations, a grid or the like. They may also be formed by individual struts, e.g., in conjunction with corner structures. Other suitable wall configurations are possible as well. The side walls are rigid in the exemplary embodiments being shown and can undergo a nonessential deformation at best. In another embodiment, they may have a greater flexibility.

The height of the side walls (5) is preferably at least equal to or greater than the height of the layer of goods (2). As a result, the inverted containers (3) can fully accommodate a layer of goods (2) in their interior enclosed by the side walls (5) and by the container bottom (7).

The container bottom (7) has a multiple function. On the one hand, it covers the layer of goods (2) accommodated in the interior (11), on the one hand. On the other hand, the supporting bottom (7) forms with its outer side a supporting surface (8) for the next high layer of goods (2) in the next higher inverted container (3).

The supporting bottom (7) may have a closed and stable wall. As an alternative, it may have openings, in which case it is configured, e.g., as a grid bottom or perforated bottom. It may have a largely flat outer side to form the supporting surface (8). Even though the supporting surface (8) may have a profiled shape with peaks and valleys in its cross section, the mutual distances are so short that a sufficiently stable and load-bearing supporting surface is obtained for the layer of goods (2) and for the individual goods possibly located therein, which supporting surface also makes it possible to move the layer of goods (2) and the individual goods possibly contained therein along the supporting surface (8).

FIG. 1 shows a first lower layer of goods (2) in an inverted container (3) and a second layer of goods (2) provided, which is arranged above it at a short distance. According to FIG. 2, the inverted container (3) is placed over this second layer of goods (2) or turned over from the top. The loose inverted container (3) is held now in a floating position, with the lower, opening-side edge of it side walls (5) ending above the underside of the layer of goods (2).

According to FIGS. 2 and 3, the upper inverted container (3) is then moved laterally, especially horizontally, while it carries the layer of goods (2) along, pushes it over the lower inverted container (3) and puts the supporting bottom (7) thereof down. The upper layer of goods (2) is supported now from below with a supporting bottom, not shown, on which the layer of goods (2) can slide in a gliding or rolling manner during the lateral motion. At the end of the lateral pushing operation according to FIG. 3, the upper inverted container (3) is still floating at a distance above the lower inverted container (3). In the last step according to FIG. 4, the upper inverted container (3) is lowered and put down on the lower inverted container (3). Its side walls (5) now come into contact with the container bottom (7) of the lower inverted container (3) and are supported hereon. The interior or storage space (11) with the layer of goods (2) is closed in this position circumferentially on all sides.

To secure the mutual positions of the inverted containers (3) stacked one upon the other in the stack of containers (4), a mutual locking (9) of the inverted containers (3) may be present in the contact area. The locking (9) may offer a mutual positive-locking guiding of the inverted containers (3) in the stack. It may have any desired and suitable configuration for this. For example, the container bottom (7) has, on its outer side, one or more local or optionally circumferential step-like depressions, which receive the opening-side edge of the side walls (5) of the upper inverted container (3) in a positive-locking manner, center it and secure it laterally against slipping. In another variant, the edges of the side walls may likewise have a step-like configuration. In addition, any other variants, especially also intermeshing pins or ribs and corresponding receiving openings are possible.

Figure 6:
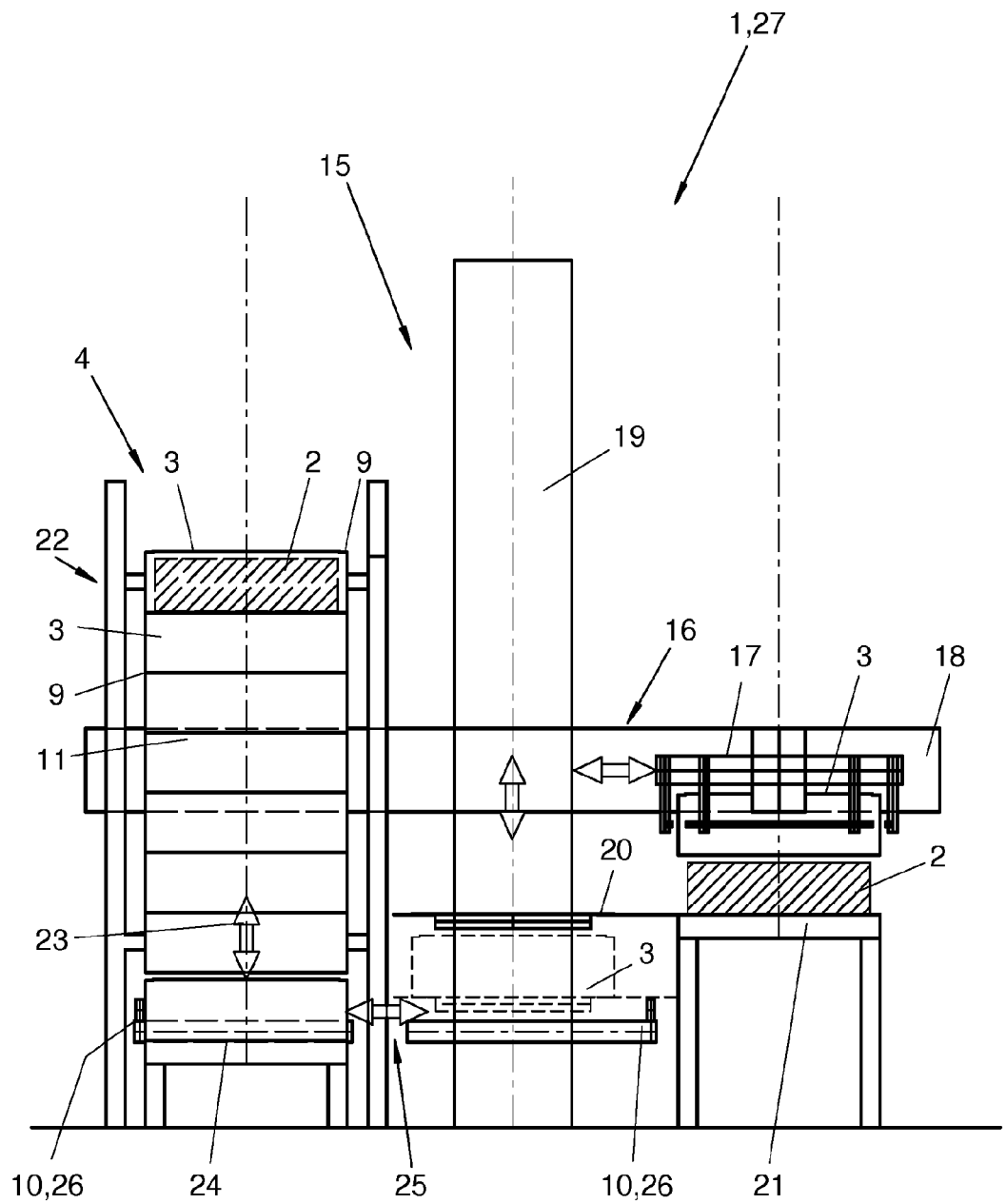
FIG. 6 is a schematic view showing a stacking device in another of different operating positions.
Figure 7:
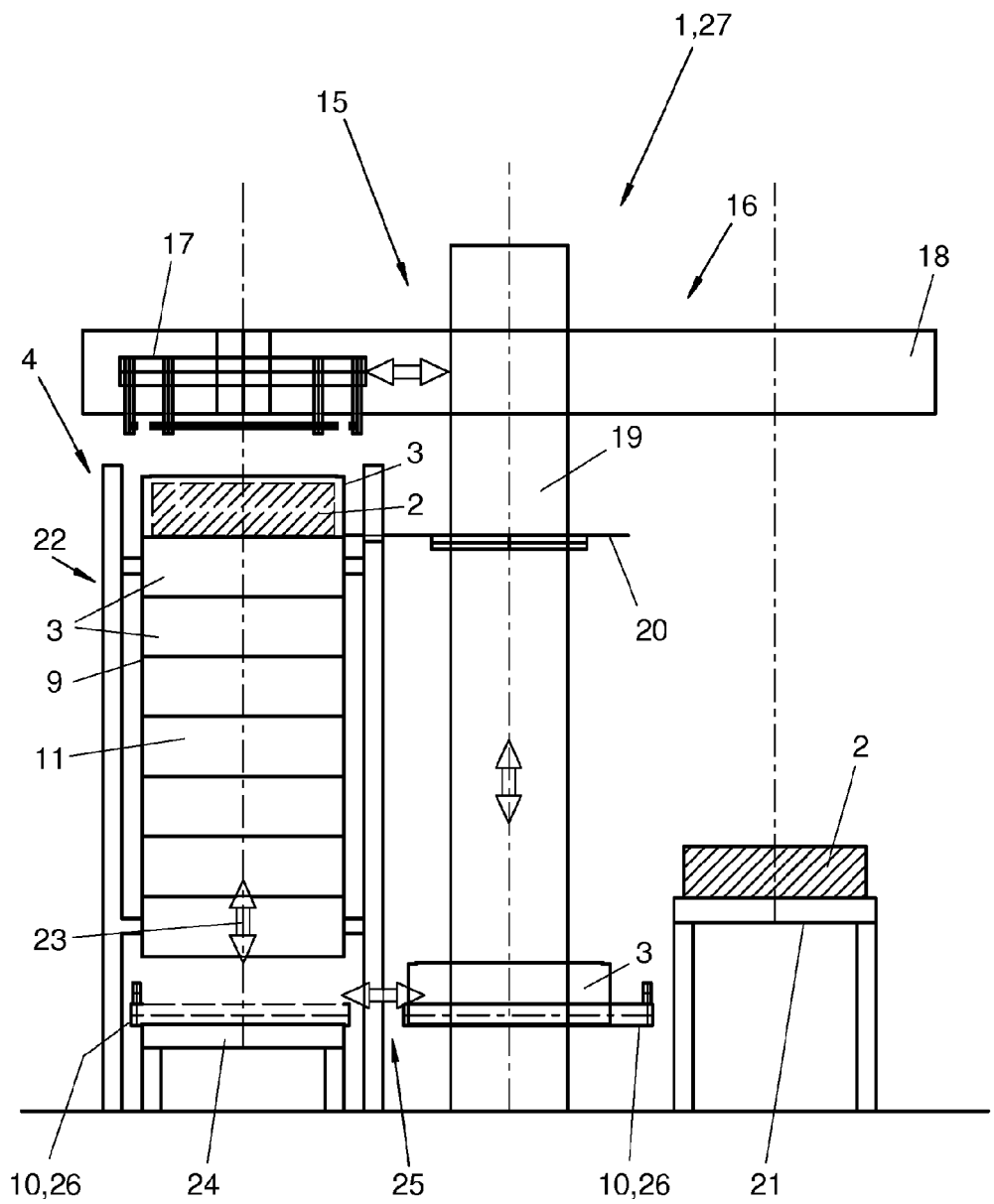
FIG. 7 is a schematic view showing a stacking device in another of different operating positions.
Figure 8:
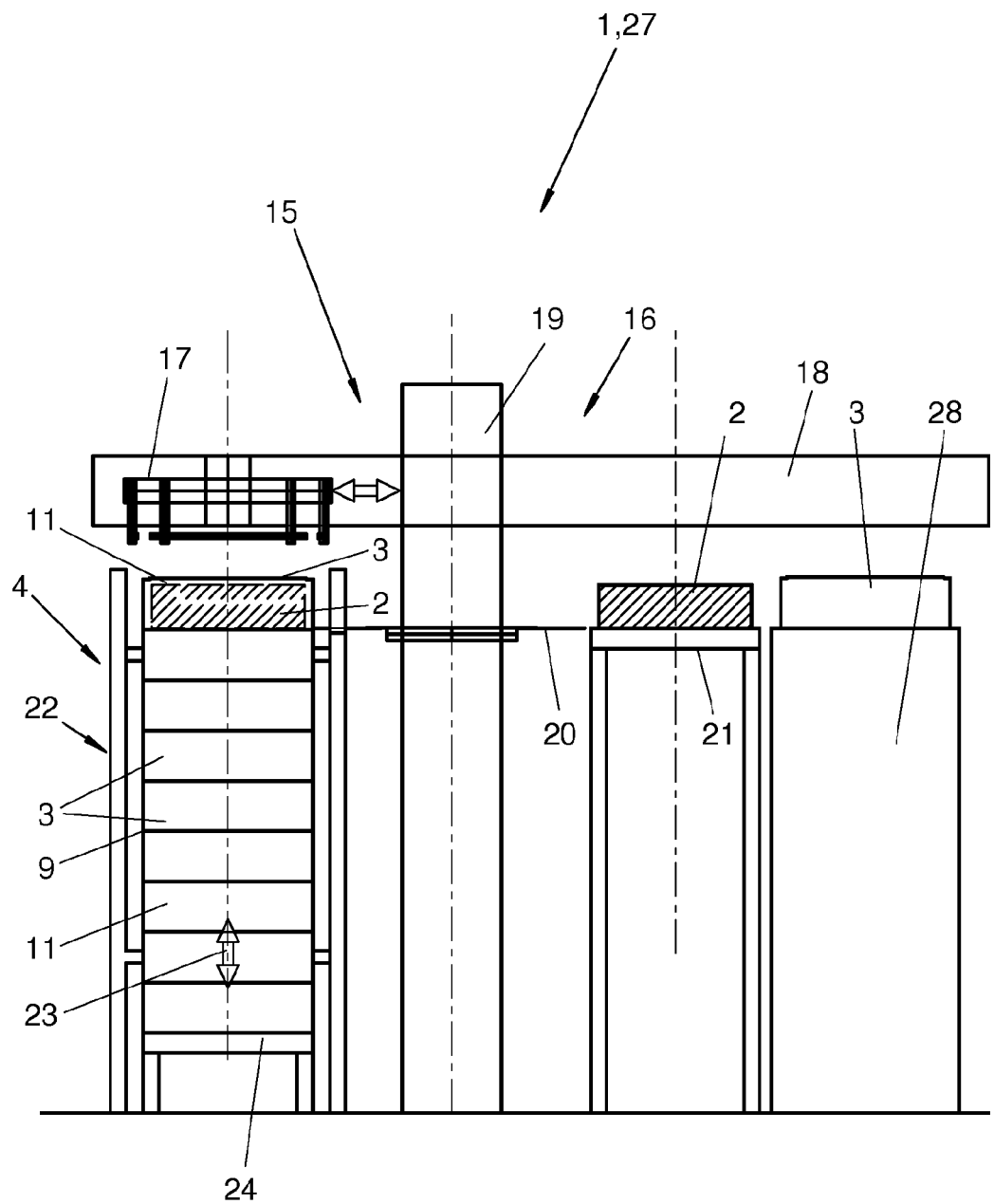
FIG. 8 is a schematic view showing a variant of the stacking device from FIGS. 5-7.
Figure 9:
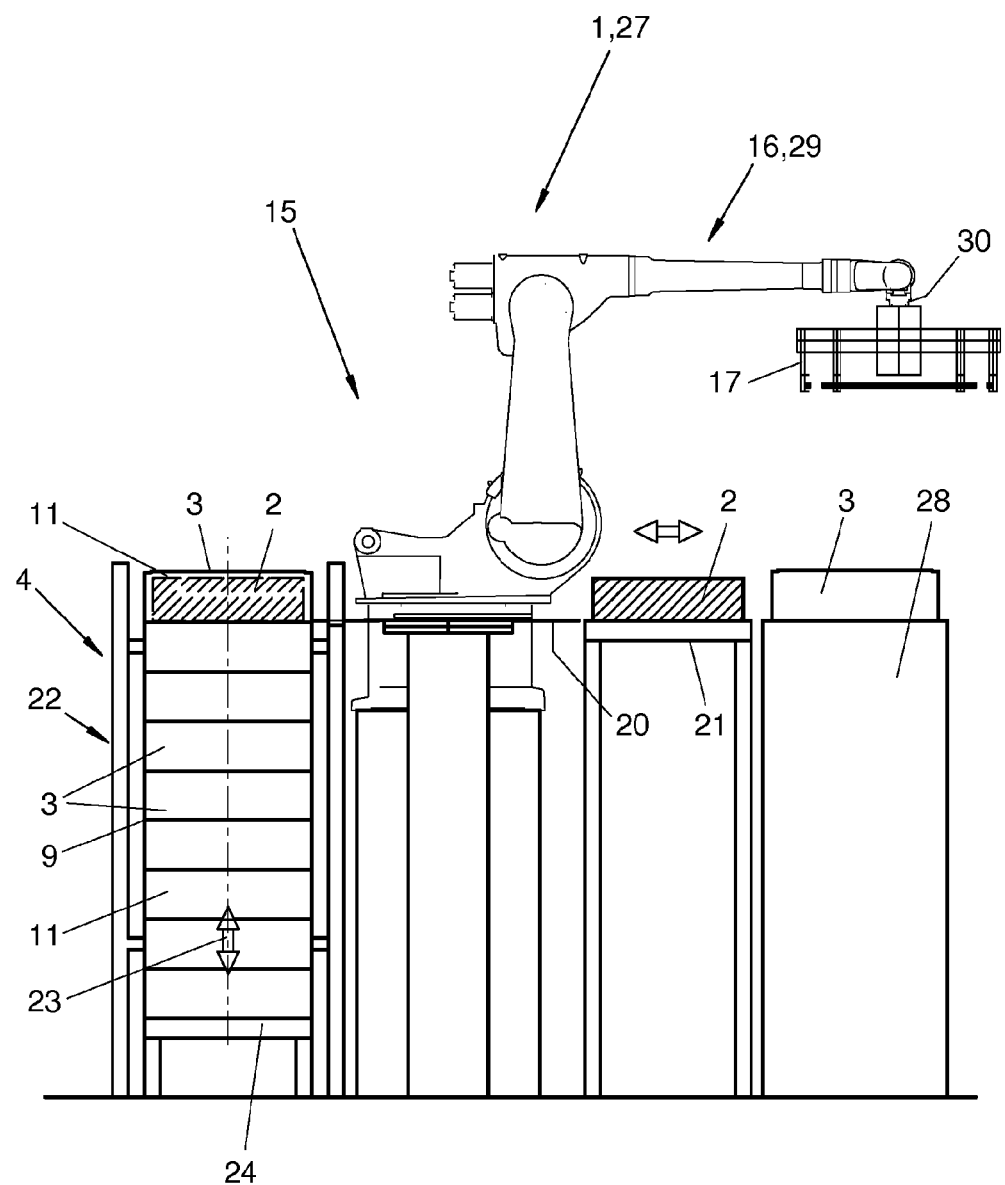
FIG. 9 is a schematic view showing another variant of the stacking device from FIGS. 5-7.

FIGS. 5 through 7 show a first embodiment of a stacking device (1), which is used to stack a plurality of inverted containers (3), forming a stack of containers (4). FIGS. 8 and 9 show two variants of the stacking device (1).

The stacking is defined as a generic term and may include both stacking and unstacking. Further, this also covers the circulation of containers described below as well as the stacking and unstacking of layers of goods (2).

In the different variants, the stacking device (1) shown has a handling device (15) for moving and stacking the loose inverted containers (3) that are open at the bottom. The inverted containers (3) can pick up a layer of goods (2) in their interior (11) in the above-described manner and form the supporting surface (8) for the next layer of goods (2) with their pointing upward container bottom (7). The layers of goods (2) in question can thus also be stacked and unstacked during the stacking and unstacking of inverted containers (3). On the other hand, it is also possible to form a stack of containers (4) from empty inverted containers (3). The inverted containers (3) are placed one on top of another and are supported on one another in the stack of containers (4).

The stack of containers (4) shown in FIGS. 5 through 7 has a tower-like configuration and contains a plurality of inverted containers (3), which are stacked one upon another and which are optionally interlocked (9) with one another. The supporting surface for the lowermost layer of goods (2) in the stack (4) may be formed by a stationary or mobile stack bottom (10). This may be an empty inverted container (3) in the simplest case. As an alternative, this may be a special supporting container, whose height is reduced, a pallet or the like. The stack bottom (10) may also be formed by a removing device (25) explained below, especially if the inverted containers (3) shall circulate in a closed circuit over the stack.

The stack of containers (4) may be arranged stationarily at the stacking device (1). As an alternative, it may be movable and especially displaceable, in which case the stack bottom (10) has a corresponding configuration for this. Such a mobile stack of containers (4) may form a container for the enclosed layers of goods (2) and make possible the protected conveying thereof. On the other hand, a stack (4) may also be formed from empty inverted containers (3), e.g., for the purpose of stocking or of introducing and removing inverted containers (3) in a larger and overarching container circulation.

The stacking device (1), especially the handling device (15), has a vertically and laterally movable slide (16) for handling and moving one or more inverted containers (3) and optionally a layer of goods (2) contained therein in the embodiment according to FIGS. 5 through 7. The handling device (15) has, further, a vertically adjustable supporting bottom (20) for a layer of goods (2). The slide (16) is intended and configured for holding a loose inverted container (3) and to turn it over a layer of goods (2) as well as for subsequently moving the inverted container (3) and the layer of goods (2) together, especially onto the above-mentioned supporting bottom (20).

The slide (16) may have any desired and suitable configuration for these functions. In the preferred embodiment shown, it has a controllable gripper (17), which can grip an inverted container (3) and which has movable and controllable gripping fingers or other similar gripping elements for this purpose. These grip, e.g., an inverted container (3) on the side. The controllable gripper (17) may otherwise have any other desired configuration for gripping and guiding an inverted container (3) in a defined manner.

The slide (16) has, further, a horizontal slide guide or gripper guide (18) for said pushing motion as well as a lifting device (19) for the aforementioned, preferably vertical lifting and lowering motion. In the embodiment shown, the gripper (18) is mounted laterally displaceably on the slide guide (18) and is moved with a corresponding controllable drive. The slide or gripper guide (18) is, in turn, connected to the lifting device (19), which has, e.g., an upright column for this with a corresponding carriage guide and with a controllable lifting drive. Other embodiments are possible as an alternative.

In a variant of the embodiment shown, the handling device (15) may have a plurality of slides (16), grippers (17) as well as guiding and driving devices (18, 19). Further, the kinematics may be different. In the embodiments shown, the gripper guide (18) is configured as a horizontal bracket and guides the gripper (18) by a linear motion. In another variant, the gripper (18) may perform a pivoting motion for laterally moving the layer of goods (2), and the gripper guide (18) may correspondingly be configured as a pivot arm, connecting rod device or the like.

The stacking device (1) has a readiness position (21) for one or more layers of goods (2). This may be configured, e.g., as a table or as a conveyor, especially as a belt conveyor. The readiness position (21) may also be integrated in an overarching conveyor system, in which case, e.g., goods, especially bottles, are manufactured by a bottle producer, especially a blowing machine, and are released in individual rows, the rows being subsequently converged to form a multirow layer in a suitable manner and are conveyed to the readiness position (21). The layer of goods (2) is presented on the readiness position (21) in a detached manner for being taken over into an inverted container (3).

A stack guide (22) is provided for the stack of containers (4) arranged on the side and optionally at a spaced location from the readiness position (21). This stack guide has a lower stack support (24), which is configured, e.g., as a stationary or mobile base. The stack support (24) may optionally also form the aforementioned stack bottom (10).

The stack guide (22) may have, further, a stack lifter (23), with which the entire stack of containers (4) or a part of the stack of containers (4) can be lifted and lowered. The stack lifter (23) grips, e.g., the lowermost or second lowermost inverted container (3) in the stack (4) and lifts or lowers it together with all inverted containers (3) stacked over it and optionally with all layers of goods (2) contained therein.

As is shown in different steps in FIGS. 5 through 7, a layer of goods (2) is placed first at the readiness position (21). The slide (16) and its gripper (17) grip a loose inverted container (3) on the side and/or from the top. The inverted container (3) may be introduced into the range of access of the slide (16) or gripper (17) and especially into the free space between the readiness position (21) and the stack guide (22) in any suitable manner. This may be carried out, e.g., by means of the removing device (25) explained below for removal from the stack of containers (4).

The slide (16) or gripper (17) picks up the inverted container (3) provided from the position indicated by broken line according to FIG. 6, places it over the layer of goods (2) and then lowers it. The support bottom (20), which is likewise vertically adjustable and is preferably arranged at the lifting device (19), is also brought by this time into a corresponding vertical position in relation to the readiness position (21), its top side being flush with the supporting surface of the readiness position (21). The slide (16) or gripper (17) subsequently pushes the inverted container (3) with the layer of goods (2) from this position shown in FIG. 6 onto the supporting bottom (20) and positions both there. The inverted container (3) is held floatingly and at a spaced location from the supporting bottom (20) in the process.

The slide (16) or the gripper (17) and the supporting bottom (20) subsequently move upward together and synchronously with the lifting device (19) up to the level of the topmost inverted container (3) in the stack (4) and the container bottom (7) or supporting surface (8) thereof. The supporting bottom (20) adjoins hereto flush, so that the slide (16) or gripper (17) can push the inverted container with the layer of goods (2) onto said supporting surface (8). The slide (16) or gripper (17) subsequently releases the inverted container (3) and returns together with the supporting bottom (20) into the starting position shown in FIG. 5. The described cycle then begins anew.

A stack of containers (4) can gradually be built up in this manner, and its height is growing. The empty inverted containers (3) are fed now from the outside in a suitable manner.

FIGS. 5 through 7 show an embodiment in which the inverted containers (3) circulate at the stacking device (1), and their number and the height of the stack of containers (4) remain equal. For example, the inverted containers (3) present in the stack (4) can gradually be filled with layers of goods (2) during this circulation.

The handling device (15) or the stack guide (22) has for this purpose a removing device (25), which is arranged, e.g., in the area near the bottom. This can remove, for example, the lowermost inverted container (3) from the stack of containers (4) and make it available for the slide (16) or gripper (17). The removing device (25) has a gripper (26), which can remove said lowermost inverted container (3) from the stack (4) and make it available in a freely accessible position. The stack lifter (23) lifts the upper part of the stack of containers (4) for this according to FIG. 5, so that the lowermost inverted container (3) indicated by broken line is released and can be brought into the readiness position drawn in solid lines. The gripper (26) may perform a pushing or pivoting motion or another suitable lateral motion in the process. The gripper (26) may have here a bottom, which may assume the function of the stack bottom (10).

After removal of the container, the rest of the stack (4) is lowered again by the stack lifter (23), so that the inverted container (3) with the layer of goods (2) can again be introduced into the stack (4) at the top in the above-described manner.

The gripper (26) may be equipped with mobile and controllable gripping fingers. In a simplified variant, the gripper (26) may be configured as a pusher and displace the inverted container (3) on the side with a rod or the like. Further, the vertically adjustable supporting bottom (20) can temporarily pick up the inverted container (3) and keep is ready for takeover for the slide (16). In another variant, the removing device (25) may be arranged in another location, especially at the top. In addition, it may have a different constructive and functional configuration.

FIG. 8 shows a first variant of the exemplary embodiment according to FIGS. 5 through 7. The readiness position (21) for the layers of goods (2) is configured as a elevated infeed in this case and is located at a level that may correspond to the level of the topmost layer of goods (2) in the stack of containers (4). The supporting bottom (20) does not need to perform any vertical motions in this case. It may be arranged stationarily. It may also be uncoupled from the lifting device (19).

As in the first exemplary embodiment, the handling device (15) may have a slide (16) with a vertically and laterally movable (18, 19) gripper (17). The lifting motions may be limited and reduced here to the lifting and lowering of the inverted container (3) for takeover and to the sliding conveying of the layer of goods (2) as well as to the putting down of the inverted container (3) in the stack of containers (4).

The lifting motions with the stack of containers (4), which are necessary for stacking and unstacking, can be carried out in such an embodiment by the stack lifter (23) and/or by a vertically adjustable lower stack support (24).

FIG. 8 shows, in addition, another variant compared to the exemplary embodiment according to FIGS. 5 through 8 concerning the feed of inverted containers (3). In the variant being shown, a separate readiness position (28) or feed and removal is provided for inverted containers (3). Empty inverted containers (3) can be made ready for being stacked or removed during unstacking. They may come from an external stockroom.

The readiness position (28) may be arranged at any desired and suitable location, e.g., next to the readiness position (21) for the layers of goods (2). The handling device (15) is correspondingly adapted and can reach the readiness position. For example, the slide guide (18) is correspondingly extended for this.

As an alternative, the above-described removing device (25) can be used in the variant according to FIG. 8 with the elevated infeed for the layers of goods (2). Further, the supporting bottom (20) may be vertically adjustable.

FIG. 9 shows a third variant of the stacking device (1) and of the handling device (15). The slide (16) of the handling device (15) is configured in this case as an industrial robot (29), which moves the inverted containers (3) with its driven element (30), e.g., a rotatable driven flange of a robot hand. Just as in the above-described exemplary embodiments, a controllable gripper (17) may be arranged on the driven element (30). The industrial robot (29) is configured, e.g., as an articulated arm robot and has a plurality of, especially four, six or more driven robot axes. The industrial robot (29) is programmable and has a robot control (not shown).

The industrial robot (29) handles and moves the inverted container (3). With a lateral motion of the inverted container (3), it performs the sliding conveying of the layer of goods (2). In addition, it can lift and lower the inverted container (3) for gripping and releasing a layer of goods (2). The industrial robot (29) may be arranged stationarily or movably, especially displaceably or pivotably along one axis or a plurality of axes. It may be floor-mounted or arranged on a carrier, especially suspended on a wall/ceiling or on a base.

The stacking device (1) may otherwise be configured according to the above exemplary embodiments. This pertains especially to the variants of the readiness position (21) and the possibly existing removing device (25).

The slide (16) of the handling device (15) in the exemplary embodiments according to FIGS. 5 through 8 may represent a linear robot with translatory robot axes with the slide guide (18) and with the lifting device (19). The articulated arm robot (29) according to FIG. 9 has rotatory robot axes. In another variant, not shown, the slide (16) may have any desired number and combination of rotatory and/or translatory robot axes in a robot configuration. Said robot axes comprise a swivel bearing or sliding bearing between adjacent robot links and a controllable and regulatable axis drive for the moving robot link in the exemplary embodiments shown.

Different variants of the embodiments shown and described are possible. The above-described stacking operation may also be reversed for unstacking. The handling device (15) now removes the topmost inverted container (3) with the layer of goods (2) from the stack (4), moves it onto the supporting bottom (20) and subsequently brings it to the readiness position (21), where the layer of goods (2) can be pushed over and released by subsequently lifting off the inverted container (3). The inverted container (3) is also used during unstacking for slidingly conveying the layer of goods (2).

There are kinematic variants for turning over the inverted containers (3) over the layer of goods (2). The inverted container (3) can be lifted and lowered by the handling device (15) relative to the layer of goods (2) in the above-described exemplary embodiments. The layer of goods may be immobile or be moving. The handling device (15) may follow a feed motion of the layer of goods (2) and grip this with the inverted container (3) "on the fly" or release it during unstacking.

As an alternative, the lifting and lowering motion of the layer of goods (2) may be performed relative to the inverted container (3) kept ready. The handling device (15) has, e.g., a lifting device for this at the readiness position (21). The stack lifter (23) and/or a vertically adjustable stack support (24) may bring about said lifting motion of the layer of goods (2) in the area of the stack of containers (4). In another variant, the inverted container (3) and the layer of goods (2) may be moved relative to one another. The lifting and lowering motion preferably takes place along a linear path. As an alternative, the path may be bent in at least some areas.

Further, it is possible to change the stacking sequence. The stacking and unstacking take place on the top side of the stack of containers (4) in the exemplary embodiment being described. As an alternative, it may take place on the underside. It is also possible to perform stacking and unstacking alternatingly at opposite ends. Further, restacking may be performed between a plurality of parallel empty and filled stacks of containers instead of the described circulation of containers over an individual stack (4).

The stacking device (1) may be part of a storage device (27), which forms, e.g., a buffer storage device for bottles or other goods in a production or treatment plant, e.g., a bottling plant. The readiness position (21) is connected for this, e.g., to a conveying line of this plant.

Figure 10:
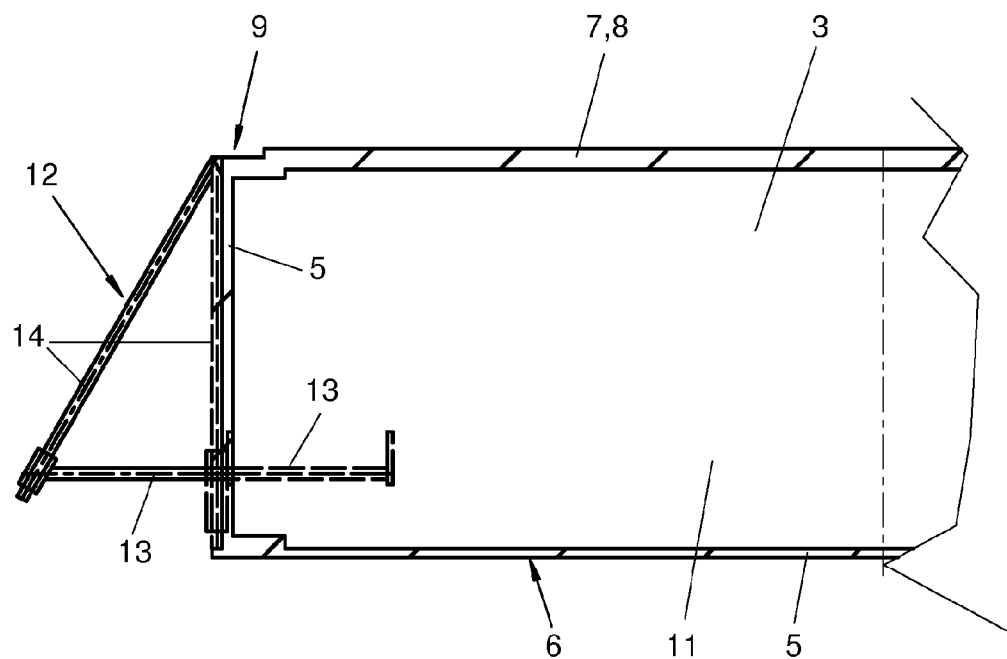
FIG. 10 is a cut-away view of an inverted container with an attached guiding device.

FIG. 10 shows a variant of the inverted container (3) with the arrangement of a guiding device (12), a so-called spacer, for the picked-up layer of goods (2). The latter may be pushed together with the spacer (12), held and its position can be secured, especially against falling over. This is advantageous if the base of the layer of goods (2) is smaller than the base of the interior (11). The guiding device (12) has a guiding element (13) acting in the interior (11) and an actuator (14) for actuating same.

In the exemplary embodiment being shown, the guiding element (13) is configured as a stop bar in the interior (11), which protrudes through an opening in the side wall (5) and is connected to an actuator (14) configured as a swiveling flap at the outer end. The flap (14) is mounted suspended and pivotably and may optionally be provided with an additional weight. It pivots downward under its own weight and pushes the stop bar (13) into the interior (11) and against the layer of goods (2) located there. The pushed-in and stop position is indicated by broken lines. The open position indicated by solid lines can be established by a suitable device, e.g., an opening arm at the slide (16) or gripper (17). In addition, any other configurations of the guiding device (12) are possible. This may also be eliminated in the simplest embodiment.

Different modifications of the embodiments shown and described are possible. This pertains, on the one hand, to a multiple arrangement of the described components of the stacking device (1), especially of the handling device (15). On the other hand, the features of the embodiments described and their variants may be combined with one another as desired and optionally also transposed.

While specific embodiments of the invention have been shown and described in detail to illustrate the application of the principles of the invention, it will be understood that the invention may be embodied otherwise without departing from such principles.

The invention claimed is:

1. A method for stacking layers of goods with a stacking device, the method comprising the steps of:
    providing loose and downwardly open inverted containers and handling, laterally moving and stacking the containers with a handling device of the stacking device;
    picking up a layer of goods with the inverted containers, in an interior of the inverted containers;
    carrying the layer of goods along as the inverted containers are slidingly conveyed; and
    forming, with the inverted containers, a supporting surface for a next layer of goods with an upwardly pointing container bottom of the inverted containers, wherein
    the inverted container and the layer of goods are moved together laterally, essentially horizontally, for the sliding conveying.

2. A method in accordance with claim 1, wherein the inverted containers are supported on one another in a stack of containers.

3. A method in accordance with claim 2, wherein the inverted containers with the layers of goods taken up or empty inverted containers are stacked in the stack of containers and the layers of goods are accommodated in the stack of containers in a storage space that is closed all around.

4. A method in accordance with claim 1, wherein the inverted containers are guided within a stack of containers and the stacking device in a container circulation.

5. A method in accordance with claim 1, wherein the inverted containers and layers of goods are stacked and/or unstacked with the stacking device.

6. A method in accordance with claim 1, wherein the inverted container is held in a floating position during the lateral motion while the layer of goods is carried along, wherein a lower opening-side edge of side walls ends above the underside of the layer of goods.

7. A method in accordance with claim 1, wherein the handling device has a slide, which is movable in a multi-axially controlled manner and with which the inverted containers are handled and moved.

8. A stacking device for layers of goods, the stacking device comprising:
    a handling device; and
    containers with a supporting surface, the handling device moving and stacking loose and upwardly open inverted containers, which take up in an interior thereof a layer of goods and form the supporting surface for a next layer of goods with the supporting surface comprising an upwardly pointing container bottom, wherein:

the handling device is configured to laterally displace an inverted container together with the layer of goods that was taken up; and the inverted containers have a lock between the container bottom and the opening-side edge of one or more side walls.

9. A stacking device in accordance with claim 8, wherein:

the handling device is configured to put down the inverted containers in a stack of containers one on top of another; and the inverted containers are configured as turned-over boxes or trays and have side walls with a container opening arranged at the bottom and with a container bottom arranged at the top.

10. A stacking device in accordance with claim 8, wherein the inverted container has a guiding device for the lateral guiding of a layer of goods that was taken up.

11. A stacking device in accordance with claim 8, wherein the handling device comprises a vertically and laterally movable slide.

12. A method for stacking layers of goods with a stacking device, the method comprising the steps of:

providing loose and downwardly open inverted containers and handling, laterally moving and stacking the containers with a handling device of the stacking device, picking up a layer of goods, with the inverted containers, in an interior of the inverted containers;

carrying the layer of goods along as the inverted containers are slidingly conveyed;

forming with the inverted containers a supporting surface for a next layer of goods with an upwardly pointing container bottom of the inverted containers, wherein a relative lifting and lowering motion is carried out between the inverted container and the layer of goods for taking up and releasing a layer of goods.

13. A method in accordance with claim 12, wherein the inverted containers are supported on one another in the a stack of containers.

14. A method in accordance with claim 12, wherein the inverted containers and layers of goods are stacked and/or unstacked with the stacking device.

15. A method in accordance with claim 12, wherein the inverted container and the layer of goods are moved together laterally, essentially horizontally, for the sliding conveying.

16. A method in accordance with claim 12, wherein the inverted container is held in a floating position during the lateral motion while the layer of goods is carried along, wherein a the lower opening-side edge of its side walls ends above the underside of the layer of goods.

17. A method in accordance with claim 12, wherein the handling device has a slide, which is movable in a multiaxially controlled manner and with which the inverted containers are handled and moved.

18. A stacking device for layers of goods, the stacking device comprising:

a handling device; and containers with a supporting surface, the handling device moving and stacking loose and upwardly open inverted containers, which take up in an interior thereof a layer of goods and form the supporting surface for a next layer of goods with the supporting surface comprising an upwardly pointing container bottom, wherein:

the handling device is configured to laterally displace an inverted container together with the layer of goods that was taken up;

the handling device comprises a vertically and laterally movable slide and the handling device comprises a stationary or vertically adjustable supporting bottom for supporting a layer of goods; and the slide is configured for inverting an inverted container over a layer of goods and for moving the inverted container and the layer of goods together onto the supporting bottom.

19. A stacking device in accordance with claim 18, wherein the slide has a controllable gripper.

20. A stacking device in accordance with claim 18, wherein:

the slide has a horizontal gripper guide; and a lifting device for the gripper or the slide has a multiaxial industrial robot with a gripper.

21. A stacking device in accordance with claim 18, further comprising a stack guide for a stack of containers and the stack guide comprises a stack lifter or a stack support or both a stack lifter and a stack support.

* * * * *